(12) United States Patent
Hori et al.

(10) Patent No.: US 6,535,680 B1
(45) Date of Patent: Mar. 18, 2003

(54) PROCESS FOR PRODUCING AN ARTICLE HAVING A PREDETERMINED SURFACE SHAPE AND OPTICAL WAVEGUIDE ELEMENT

(75) Inventors: Masahiro Hori, Osaka (JP); Koichiro Nakamura, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/831,873

(22) PCT Filed: Sep. 12, 2000

(86) PCT No.: PCT/JP00/06228

§ 371 (c)(1),
(2), (4) Date: May 16, 2001

(87) PCT Pub. No.: WO01/19587

PCT Pub. Date: Mar. 22, 2001

(30) Foreign Application Priority Data

Sep. 16, 1999 (JP) .......................................... 11-261924

(51) Int. Cl.[7] ................................................. G02B 6/10
(52) U.S. Cl. ....................... 385/130; 385/129; 385/143; 385/145
(58) Field of Search ................................. 385/129, 130, 385/131, 132, 143, 145

(56) References Cited

U.S. PATENT DOCUMENTS

| | | | |
|---|---|---|---|
| 3,650,808 A | | 3/1972 | Gagnon |
| 4,024,306 A | | 5/1977 | Takamizawa |
| 5,519,803 A | * | 5/1996 | Shiono et al. ............... 385/132 |
| 5,540,799 A | | 7/1996 | Lebby |
| 5,716,679 A | | 2/1998 | Krug |
| 5,881,188 A | * | 3/1999 | Starodubov ................... 385/37 |
| 6,361,718 B1 | * | 3/2002 | Shiono et al. ............. 264/1.21 |

FOREIGN PATENT DOCUMENTS

| | | | | |
|---|---|---|---|---|
| EP | 0 278 060 | | 8/1988 | |
| EP | 1174258 A1 | * | 1/2002 | ........... B32B/27/00 |
| JP | 60-159014 | | 8/1985 | |
| JP | 62-102445 | | 5/1987 | |
| JP | 62-175703 | | 8/1987 | |
| JP | 62-225273 | | 10/1987 | |
| JP | 63-49702 | | 3/1988 | |
| JP | 6-242303 | | 9/1994 | |
| JP | 10-142410 | | 5/1998 | |
| JP | 02001240800 A | * | 9/2001 | ............. G02B/3/00 |
| JP | 02001252927 A | * | 9/2001 | ............. G02B/3/00 |
| WO | 99/39890 | | 8/1999 | |
| WO | WO 01/19587 A1 | * | 3/2001 | ............. G02B/3/00 |

OTHER PUBLICATIONS

Patent Abstracts of Japan, vol. 1998, No. 4, (Mar. 1998)—Abstract JP 09–324051.

Yoshimura et al., Journal of Lightwave Technology, vol. 16, No. 6, pp. 1030–1037 (1998).

Usui et al., Journal of Lightwave Technology, vol. 14, No. 10, pp. 2338–2343 (1996).

* cited by examiner

*Primary Examiner*—Akm E. Ullah
*Assistant Examiner*—Jennifer Doan
(74) *Attorney, Agent, or Firm*—Wenderoth, Lind & Ponack, L.L.P.

(57) ABSTRACT

There is provided an article which can be produced at a low cost, is excellent in heat resistance, chemical resistance and dimensional accuracy, and has a predetermined surface shape. In particular there is provided an optical waveguide which has high heat resistance and chemical resistance, a large difference in refractive index, small absorption at a communication wavelength of a near infrared range, reliability and a low loss at an optical communication range. The process for producing the article involves disposing a sol-gel material containing specified silanes between a substrate and a mold in the form of a film so as to make the sol-gel material closely contact the substrate and the mold, and heating to form a gelled film having a surface shape which is the inversion of the surface shape of the mold on the surface of the substrate.

7 Claims, No Drawings

PROCESS FOR PRODUCING AN ARTICLE HAVING A PREDETERMINED SURFACE SHAPE AND OPTICAL WAVEGUIDE ELEMENT

DETAILED DESCRIPTION OF THE INVENTION

1. Field of the Invention

The present invention relates to a process for producing articles having a predetermined fine uneven portion on the surface of a substrate, particularly fine optical elements and information recording medium substrates.

2. Description of the Prior Art

CD-ROMs and other information recording media, and optical parts such as planar microlenses (an array of microlenses arranged on a substrate in parallel or zigzags), Fresnel lenses, diffraction grating elements and optical waveguide elements must have a predetermined fine uneven portion on the surface. The fine uneven portion on the surface serves as a pit or tracking guide in an information recording medium and as a microlens or diffraction grating for converging or diffusing light in an optical part.

(1) To form the uneven portion on the surface, there is known a process in which an ultraviolet curable resin is uniformly spread over a substrate and irradiated with ultraviolet radiation while a mold having an uneven portion is pressed against the resin to form a resin film having a surface shape which is the inversion of the surface shape of the mold on the substrate (JP-A 63-49702) (the term "JP-A" as used herein means an "unexamined published Japanese patent application").

(2) There is also known a production process in which a hydrolysis solution prepared from a metal alcoholate is pressed against a transfer mold and cured by heat and light (JP-A 62-102445, JP-A 62-225273 and JP-A 10-142410). For example, JP-A 62-102445 discloses a so-called sol-gel production process in which a solution containing silicon alkoxide is applied to the surface of a glass substrate and heated while a mold having an uneven portion is pressed against the solution to form a gelled film having a surface shape which is the inversion of the surface shape of the mold on the surface of the substrate.

(3) WO99/39890 discloses a process for producing an article having a 1 μm to 1 mm thick single layer and an uneven surface with an unevenness of 1 to 40 μm by a sol-gel production process. That is, it teaches a process for producing an article having an uneven surface by adhering a sol-gel material containing dimethyldiethoxysilane and phenyltriethoxysilane between a substrate and a mold, arranging it into the form of a film and heating to form a gelled film having a surface shape which is the inversion of the surface shape of the mold on the surface of the substrate.

As for optical waveguide elements, there are known optical waveguide elements which are produced from organic materials such as (4) PMMA (Ryoko Yoshimura. J. of Lightwave Technology, Vol. 16, No. 6, 1998), (5) a polyimide and (6) a silicon-based polymer (Mitsuo Usui, J. of Lightwave Technology, Vol. 14, No. 10, 1996) by photolithography and etching in addition to optical waveguide elements produced from inorganic materials.

Problems to be Solved by the Invention

However, the above prior arts have the following problems to be solved. First, in the above process (1), the ultraviolet curable resin decomposes or yellows at a temperature higher than 250° C. due to its low heat resistance. Therefore, the substrate having an uneven portion of the ultraviolet curable resin cannot be applied to heat processing such as soldering and difficult to be attached to a device.

In the process (2), the gelled film (organopolysiloxane layer) has high heat resistance and can be soldered. This is a method for forming a laminate by molding organopolysiloxane layers one after another, which makes it possible to form an organopolysiloxane layer having an uneven surface and a thickness of several tens of micrometers. However, this production process is long, thereby boosting costs. Further, since the next layer is formed after an underlying layer is completely cured, undesired air is easily contained between the mold and the solution or sol with the result of low dimensional accuracy of the uneven portion.

The process (3) is capable of forming a film as thick as 1 μm to 1 mm. However, it is difficult to peel off an organopolysiloxane film from the mold due to low releasability with the mold when the mold having an uneven shape as large as 40 μm or more is to be released after it is pressed against the sol-gel material and heated. As a result, the process has such problems that part of the film remains on the mold and that there is a big dimensional error between the surface shape of the film and the surface shape of the mold.

As for optical waveguides, optical waveguide elements produced from inorganic materials have high reliability but cannot be mass-produced at a low cost. As for optical waveguide elements produced from the above organic materials (4) to (6), there are few materials which have satisfactory heat resistance and a complicated step such as photolithography or etching is needed to form a core portion for transmitting light.

The present invention has been made in view of the above problems of the prior art.

It is an object of the present invention to provide an article which can be produced at a low cost, and has excellent heat resistance and dimensional accuracy and a more uneven surface than that of the prior art, for example, an unevenness of 1 to 500 μm. It is another object of the present invention to provide an optical waveguide which has high heat resistance and small absorption at a communication wavelength of a near infrared range, and is satisfactory for reliability and a low loss at an optical communication range.

It is still another object of the present invention to provide an industrially advantageous process for producing the above article and optical waveguide of the present invention.

Other objects and advantages of the present invention will become apparent from the following description.

Means for Solving the Problems

Firstly, according to the present invention, the above objects and advantages of the present invention are attained by a process for producing an article having a predetermined surface shape, which comprises disposing a sol-gel material between a substrate and a mold in the form of a film so as to make the sol-gel material closely contact with the substrate and the mold, and heating the film to form a gelled film having a surface shape which is the inversion of the surface shape of the mold on the surface of the substrate, said sol-gel material containing at least one of (A) a silane compound represented by the following formula (1) and (B) a silane compound represented by the following formula (2), and (C) a silane compound represented by the following formula (3):

$$R^1_2SiX_2 \tag{1}$$

wherein $R^1$ is an alkyl group and X is an alkoxyl group or halogen atom, $$R^2SiY_3 \quad (2)$$

wherein $R^2$ is an aryl group or substituted aryl group and Y is an alkoxyl group or halogen atom, $$R^3SiZ_3 \quad (3)$$

wherein $R^3$ is a fluorine-containing alkyl group and Z is an alkoxyl group or halogen atom.

Secondly, the above objects and advantages of the present invention are attained by an article having a predetermined surface shape, which comprises a substrate and an organopolysiloxane film having a maximum thickness of 1 µm to 1 mm formed on the surface of the substrate, wherein the organopolysiloxane film contains as essential ingredients at least one of a dialkylsiloxane represented by the following formula (4) and an arylsiloxane (or substituted arylsiloxane) represented by the following formula (5), and (6) a fluoroalkylsiloxane represented by the following formula (6):

$$R^4{}_2SiO_{2/2} \quad (4)$$

wherein $R^4$ is an alkyl group, $$R^5SiO_{3/2} \quad (5)$$

wherein $R^5$ is an aryl group or substituted aryl group, $$R^6SiO_{3/2} \quad (6)$$

wherein $R^6$ is a fluorine-containing alkyl group.

Thirdly, the above objects and advantages of the present invention are attained by an optical waveguide element which has a 10 µm to 1 mm thick organopolysiloxane film formed on the surface of a substrate, the organopolysiloxane film being an optical waveguide which comprises a core portion for transmitting light, having a height of 5 to 30 µm, a width of 5 to 30 µm and length extending along the surface of the organopolysiloxane film and a clad portion surrounding the core portion and having a lower refractive index than the core portion, wherein the organopolysiloxane film contains at least one of a dialkylsiloxane represented by the following formula (7) and an arylsiloxane or substituted arylsiloxane represented by the following formula (8), and a fluoroalkylsiloxane represented by the following formula (9) as essential ingredients:

$$R^7{}_2SiO_{2/2} \quad (7)$$

wherein $R^7$ is an alkyl group, $$R^8SiO_{3/2} \quad (8)$$

wherein $R^8$ is an aryl group or substituted aryl group, $$R^9SiO_{3/2} \quad (9)$$

wherein $R^9$ is a fluorine-containing alkyl group.

In the present invention, the sol-gel material contains at least one of the silane compound (to be referred to as "component (A)" hereinafter) represented by the above formula (1) and the silane compound (to be referred to as "component (B)" hereinafter) represented by the above formula (2), and the silane compound (to be referred to as "component (C)" hereinafter) represented by the above formula (3).

In the above formula (1), $R^1$ is an alkyl group and X is an alkoxyl group or halogen atom. The alkyl group represented by $R^1$ may be linear or branched and is preferably an alkyl group having 1 to 3 carbon atoms. The alkoxyl group represented by X may be linear or branched and is preferably an alkoxyl group having 1 to 4 carbon atoms. The halogen atom represented by X is fluorine, chlorine or bromine. X is particularly preferably an alkoxyl group having 1 to 3 carbon atom or chlorine atom.

Preferred examples of the component (A) include dialkyldialkoxysilanes such as dimethyldiethoxysilane, dimethyldimethoxysilane, diethyldiethoxysilane and diethyldimethoxysilane; and dialkyldihalidesilanes such as dimethyldichlorosilane, dimethyldibromosilane, diethyldichlorosilane and diethyldibromosilane. Condensates of the above monomers having a condensation degree of 2 to 10 may be used in addition to these monomers. When one of the above condensates is used, the amount of the monomer of the condensate is used as the amount of the component (A).

In the silane compound (component (B)) represented by the above formula (2), $R^2$ is a substituted or nonsubstituted aryl group and Y is an alkoxyl group or halogen atom. The nonsubstituted aryl group is preferably an aryl group having 6 to 13 carbon atoms such as phenyl, biphenyl and naphthyl. The substituent of the aryl group is preferably an alkyl group having 1 to 3 carbon atoms or halogen atom. Examples of the aryl group substituted with the above substituent include tolyl, xylyl and chlorophenyl. Examples of the alkoxyl group and halogen atom represented by Y are the same as those enumerated for X of the formula (1).

Examples of the silane compound represented by the above formula (2) (component (B)) include trialkoxysilanes having a phenyl group or substituted phenyl group such as phenyltriethoxysilane, phenyltrimethoxysilane, triethoxysilane having a substituted phenyl group with a halogen atom, for example, a chlorine atom substituted for some of the hydrogen atoms of a phenyl group and trimethoxysilane having the same substituted phenyl group as described above; phenyltrichlorosilane and trichlorosilane having a substituted phenyl group with a halogen atom, for example, a chlorine atom substituted for some of the hydrogen atoms of a phenyl group; tolyltrimethoxysilane and tolyltriethoxysilane; tolyltrichlorosilane; xylyltrimethoxysilane and xylyltriethoxysilane: xylyltrichlorosilane; biphenyltrimethoxysilane and biphenyltriethoxysilane; and biphenyltrichlorosilane. Condensates of these monomers having a condensation degree of 2 to 10 may also be used in addition to the above monomers. When one of the above condensates is used, the amount of the monomer of the condensate is used as the amount of the component (B).

In the silane compound (component (C)) represented by the above formula (3), $R^3$ is a linear or branched alkyl group, preferably an alkyl group having 3 to 5 carbon atoms. The silane compound is preferably a trialkoxysilane having an fluorine-containing alkyl group with a fluorine atom substituted for 3 or more of the hydrogen atoms of an alkyl group (or trihalogensilane). Examples of the alkoxyl group and the halogen atom represented by Z in the above formula (3) are the same as those enumerated for X of the formula (1).

In the component (C), the alkyl group may be linear or branched and is preferably an alkyl group having 3 to 5 carbon atoms. The component (C) is preferably a trialkoxysilane having a fluorine-containing alkyl group with a fluorine atom substituted for 3 or more of the hydrogen atoms of an alkyl group or trihalogensilane. Preferred examples of the component (C) include (3,3,3-trifluoropropyl)trimethoxysilane, (3,3,3-trifluoropropyl)

trichlorosilane and (tridecafluoro-1,1,2,2-tetrahydrooctyl) triethoxysilane. Condensates of these monomers having a condensation degree of 2 to 10, such as poly-3,3,3-trifluoropropylmethylsiloxane having a condensation degree of 5 may also be used in addition to the above monomers. A copolymer of 3,3,3-trifluoropropylmethylsiloxane and dimethylsiloxane (molar ratio of 1:1) having a condensation degree of 10 may be used alone as the component (A) and the component (C).

When one of the above condensates is used, the amount of the monomer of the condensate is used as the amount of the component (C).

When an alkoxysilane having methoxy or ethoxy as an alkoxyl group is used as the above components (A), (B) and (C), an alcohol formed by a hydrolytic reaction is easily volatilized advantageously. A preferred combination of the components (A), (B) and (C) of the sol-gel material is a combination of dimethyldialkoxysilane, phenyltrialkoxysilane and (3,3,3-trifluoropropyl)trimethoxysilane.

In the present invention, at least one, preferably both of the components (A) and (B), and the component (C) are used as raw materials for the sol-gel material. An alkyl group such as methyl (or aryl group or substituted aryl group, such as phenyl group or substituted phenyl group) and fluoroalkyl group remain in large quantities in the film finally obtained by coating the substrate with these. Since the methyl group (or phenyl group or substituted phenyl group) and fluoroalkyl group serve to provide elasticity to the film by reducing the fragility of the film, they can suppress thermal stress generated in the interior of the film, thereby preventing the cracking of the film and the peeling off of the film from the substrate of an article.

A case where the component (A) is a dimethyldialkoxysilane, the component (B) is a trialkoxysilane containing a phenyl group and the component (C) is a fluoroalkyltrialkoxysilane will be taken as an example to illustrate the present invention.

Since the film structure of the present invention contains at least one of dimethylsiloxane (derived from a dimethyldialkoxysilane) and a phenyl group-containing siloxane (derived from a phenyl group-containing trialkoxysilane), and a fluoroalkylsiloxane (derived from a fluoroalkyltrialkoxysilane), adhesive force between the film and the mold or the friction coefficient of the adhesive surface is reduced, thereby making it possible to provide excellent releasability as well as high elasticity and high-temperature stability. Therefore, the film can be molded by compression, extrusion and injection molding due to improved processability. A film having an uneven surface with an unevenness of more than 100 $\mu$m which has been difficult to be released from the mold in the prior art can be released from the mold and molded without leaving part of the film on the mold.

When the film structure of the present invention contains dimethylsiloxane and fluoroalkylsiloxane (derived from a fluoroalkyltrialkoxysilane), a trialkoxysilane is connected to the terminals of a linear dimethyldialkoxysilane extending in a fibrous manner three-dimensionally, whereby room is formed in the three-dimensional skeleton and this film structure further provides elasticity to the film and reduces the fragility of the film, thereby making it possible to form a thick film.

When the film structure of the present invention contains a phenyl group-containing siloxane and a fluorine-containing alkylsiloxane, the phenyl group is bulky enough to provide elasticity to the skeleton structure of an oxide contained in the film by reducing the fragility of the film and also has stability at high temperatures due to its conjugated system compared with other organic groups. Therefore, the film does not discolor or crack even at 300° C. For example, a film which contains a cyclohexyltrialkoxysilane having a cyclohexyl group without a conjugated system substituted for a phenyl group and a fluoroalkyltrialkoxysilane discolors and cracks at a temperature of 2 to 300° C.

The raw materials for the sol-gel material preferably include 0 to 95 mol % of the component (A), 0 to 95 mol % of the component (B) (the total of the components (A) and (B) is 30 to 95 mol %), and 5 to 70 mol % of the component (C) based on the total number of mols of the components (A), (B) and (C).

The amount of the component (A) is more preferably 30 to 60 mol % (therefore, the amount of the component (B) is 0 to 65 mol %). The amount of the component (B) is more preferably 10 to 50 mol % (therefore, the amount of the component (A) is 30 to 60 mol %). The amount of the component (C) is more preferably 10 to 50 mol % (therefore, the total of the components (A) and (B) is 50 to 90 mol %).

When the component (A) is contained in an amount of 30 mol % or more, the flexibility of the obtained film is enhanced and there is no possibility that the film cracks at the time of final heating or cooling after final heating even if the film thickness is 20 $\mu$m or more. When the amount of the component (A) is 60 mol % or less, the film is easily formed in the end by preventing the volatilization of the components of the film at the time of final heating (baking). When the amount of the component (B) is smaller than 10 mol %, the film hardly cures and most of the components volatilize at the time of final heating (baking) and the film is hardly formed in the end. When the amount of the component (B) is larger than 50 mol %, the flexibility of the film is impaired and a film having a thickness of 20 $\mu$m or more easily cracks at the time of final heating or cooling after final heating. When the amount of the component (C) is smaller than 10 mol %, a releasing effect is lost and when the amount of the component (C) is larger than 50 mol %, releasability becomes too high, whereby the adhesion of the film to the substrate is lost and the film peels off from the substrate when the film is formed on glass or the like.

When an alkoxysilane having an organic group other than the above, for example, a mixture of dimethyldimethoxysilane and vinyltriethoxysilane is used as a raw material for the sol-gel material, the heat resistance of the obtained film becomes so low that the obtained film thermally decomposes at 300° C. or less.

When a tetraalkoxysilane is used as the only raw material, when an alkyltrialkoxysilane is used as the only raw material and when a mixture of dialkyldialkoxysilane and alkyltrialkoxysilane is used as the raw material, the stress of the obtained film grows after final heating, whereby the film cracks if it has a thickness of 20 $\mu$m or more.

The raw materials for the sol-gel material in the present invention are a mixture of at least one of the components (A) and (B) and the component (C), and an alcohol as a solvent. The alcohol to be added is a lower alcohol having 1 to 4 carbon atoms, particularly preferably methanol or ethanol having a low boiling point. The reason for this is that the alcohol can be removed from the solution swiftly by heating at a relatively low temperature after hydrolysis. The amount of the alcohol added is preferably 0.3 to 3 times, more preferably 0.5 to 1.5 times the total number of mols of the components (A), (B) and (C).

The raw materials for the sol-gel material include a catalyst for hydrolyzing the components (A), (B) and (C). The catalyst is preferably an acid catalyst. Preferred examples of the acid catalyst include formic acid, acetic acid, tetrafluoroacetic acid, propionic acid, oxalic acid, hydrochloric acid, nitric acid and sulfuric acid. At least one of the above acid catalysts is preferably used in the form of an aqueous solution. If the amount of the acid catalyst added which differs according to the type of the acid and the strength (weak or strong acid) of protonic acid is too small, the proceeding of hydrolytic and dehydration/condensation reactions will become slow and if the amount is too large, the condensation reaction will proceed too far, the molecular weight will become too large, and the gelation of a precipitate or coating solution will readily occur disadvantageously. To ensure that the above solution for forming a film should contain the silane compounds (A), (B) and (C) in the form of unhydrolysates in amounts of 0.5 to 40% and 0.5 to 60% based on the amounts of the silane compounds (A), (B) and (C) contained in the above raw material solution, respectively, organic acids which are weak acids out of the above acid catalysts are preferably used. Out of the organic acids, formic acid is particularly preferred because it has a small molecular weight and easily evaporates. The amount of the acid catalyst to be added is preferably 0.5 to 5 mmol, more preferably 0.7 to 2 mmol based on 1 mol of the total of the components (A), (B) and (C) when formic acid is used as the acid catalyst.

It is preferred to add water in an amount more than a stoichiometric amount required for hydrolysis. When the amount of water is smaller than the stoichiometric amount, the unreacted silane compounds (A), (B) and (C) easily volatilize during a heat treatment for gelation. The amount of water including water of the aqueous solution of the catalyst is generally 1.1 to 30 times the required stoichiometric amount and the molar ratio thereof to the total of the components (A), (B) and (C) is preferably 2:1 to 20:1, more preferably 3:1 to 10:1. When the optical element of the present invention is located in close vicinity to a memory or other electronic circuit, if chlorine is contained in the optical element of the present invention, it may shorten the service life of the electronic circuit. Therefore, it is preferred to use an acid catalyst containing no chlorine.

In the present invention, a solution containing at least one of the components (A) and (B), the component (C), alcohol solvent, water and catalyst as the raw materials for the sol-gel material is maintained room temperature for 90 to 120 minutes under agitation to hydrolyze the alkoxysilanes so as to prepare a sol-gel material. When a film having a final thickness of 30 $\mu$m or less is to be formed, this sol-gel material is used. When a film having a final thickness of more than 30 $\mu$m is to be formed and when it is necessary to further enhance releasability depending on the material and shape of the mold, it is desired to promote a dehydration/polycondensation reaction by maintaining the solution at room temperature to 140° C., preferably 70 to 100° C. for 6 to 30 hours and to vaporize and evaporate the solvent and water contained in the solution and an alcohol and water which are dehydration/polycondensation reaction products. As a result, the mass and volume of the solution decrease to 25 to 35 wt % and volume % of the initial mass and volume thereof. Thereby, the shrinkage of the formed film is suppressed as much as possible to prevent the cracking of the film and to enable the formation of a cured film without forming air bubbles in the film at the time of final heating. If the hydration/polycondensation reaction proceeds too far, the viscosity of the solution will become too high, thereby making it difficult to coat the surface of the mold or the substrate. If the hydration/polycondensation reaction proceeds insufficient, the formation of air bubbles in the film at the time of final heating cannot be prevented. It is preferred to control the proceeding of the dehydration/polycondensation reaction by selecting temperature and retention time to control the viscosity of the solution to $10^3$ poise or less.

Two typical processes for molding an optical element covered with a gelled film having a surface shape which is the inversion of the surface shape of the mold by adhering the above sol-gel material between the substrate and the mold, arranging it into the form of a film and heating are given below.

The first process (to be referred to as "mold pouring process" hereinafter) comprises pouring a sold-gel material solution into a mold, heating, contacting the substrate of an article to the material and further heating to bond the molded film to the substrate, releasing the mold and finally heating the film. That is, the mold having a fine uneven shape is maintained horizontal, the liquid sol-gel material having a viscosity of $10^3$ poise or less is poured into the mold to fill depressed portions of the mold. In place of pouring, the mold may be immersed in a bath of the sol-gel material, or the sol-gel material solution may be applied to the surface of the mold with a brush. In this state, a dehydration/polycondensation reaction is promoted by maintaining the sol-gel material at 140 to 180° C. for 20 to 120 minutes until the viscosity of the sol-gel material spread over the mold becomes $10^4$ to $10^8$ poise.

Thereafter, the substrate is brought into close contact with the mold so that the sol-gel material contacts the surface of the substrate without forming any gap therebetween, and maintained at 140 to 180° C. for 10 to 120 minutes to almost complete the dehydration/polycondensation reaction of the sol-gel material for gelation. By removing and releasing the mold, a polysiloxane film, a soft gelled film having an uneven surface shape which is the inversion of the uneven surface shape of the mold is formed on the substrate in such a manner that it is bonded to the surface of the substrate. When the mold is released too early, the polysiloxane film is too soft and its uneven surface shape is deformed by its own weight. Therefore, the above heating is carried out until this deformation does not occur.

The film is finally heated at 180 to 350° C. for 10 to 150 minutes to polycondense the residual silanol group of the polysiloxane film and vaporize water formed by polycondensation, whereby the film slightly shrinks in volume in a thickness direction to become a fine film. Thus, an optical element or other article covered with a film having a surface shape which is the inversion of the surface shape of the mold is obtained.

The second process (to be referred to as "substrate pouring process" hereinafter) comprises pouring the sol-gel material solution directly over the surface of the substrate, heating, pressing a mold against the film on the surface of the substrate of an article when the liquid film achieves plasticity (the viscosity of the liquid becomes about $10^4$ to $10^8$ poise), heating in this state, transfer molding, releasing the mold and finally heating the film. That is, the surface to be coated of the substrate of the article is maintained horizontal, and the liquid sol-gel material having a viscosity of $10^3$ poise or less is poured over the substrate and spread over the substrate into the form of a film having a predetermined thickness. In this state, a dehydration/polycondensation reaction is promoted by maintaining the sol-gel material at 140 to 180° C. for 20 to 120 minutes until the viscosity of the poured sol-gel material becomes $10^4$ to $10^8$ poise. The mold having a fine uneven surface shape is pressed against the film-like sol-gel material and maintained at a pressure of 0.5 to 120 kg/cm$^2$ and a temperature of 160 to 350° C. for 60 seconds to 60 minutes to almost complete the dehydration/polycondensation reaction of the sol-gel material for gelation. By removing the mold, a polysiloxane film, a gelled film having an uneven surface shape which is the inversion of the uneven surface shape of the mold is formed on the substrate in such a manner that it is bonded to the surface of the substrate. It is finally heated at 180 to 350° C. for 10 to 150 minutes to polycondense the residual silanol group of the polysiloxane film and vaporize water formed by this polycondensation, whereby the film slightly shrinks in volume in a thickness direction to become a fine film. Thus, an optical element, such as CD-ROM or other information recording medium, planar microlens (an array of microlenses arranged on a substrate in parallel or zigzags), Fresnel lens, optical elements such as diffraction grating element or optical waveguide element, or other article covered with a film having a surface shape which is the inversion of the surface shape of the mold is obtained.

As for the above mold, the flat surface of a glass substrate is etched precisely to form a concave mold having a target shape, for example. A convex metal mother die can be produced by electroless plating and electrolytic plating using this as a master mold. A convex metal master mold can be produced by the above plating using the above concave mold as a mother die and further a concave metal mother die can be produced by the above plating using this master mold. These convex and concave mother dies can be used as molds. In the above plating, a metal such as nickel or chromium is preferably used. A resin mother die may be fabricated from an ultraviolet curable resin by 2P molding using the master mold produced by the above method and used as a mold.

Thus, according to the present invention, an organopolysiloxane film having a heat resistance of 350° C., a maximum thickness (thickness measured at a convex portion of the surface) of 1 $\mu$m to 1 mm, preferably 20 to 150 $\mu$m and a refractive index of 1.50 to 1.54 which is close to that of general glass, and whose fine concave and convex portions having a predetermined width (pitch of unevens) of 1 to 500 $\mu$m and a predetermined height of 5 to 500 $\mu$m are formed on the main surface or in a direction perpendicular to the main surface is formed on a flat plate-like or curved plate-like substrate.

Preferably, the organopolysiloxane forming this film contains a dialkylsiloxane represented by the above formula (4) in an amount of 0 to 95 mol %, an arylsiloxane (or substituted arylsiloxane) represented by the above formula (5) in an amount of 0 to 95 mol % (the total of these components is 30 to 95 mol %), and a fluoroalkylsiloxane represented by the above formula (6) in an amount of 5 to 70 mol % based on the total number of mols of the dialkylsiloxane represented by the above formula (4), the arylsiloxane represented by the above formula (5) and the fluoroalkylsiloxane represented by the above formula (6). More preferably, the organopolysiloxane contains the dialkylsiloxane in an amount of 30 to 60 mol %, the arylsiloxane (or substituted arylsiloxane) in an amount of 10 to 50 mol %, and the fluoroalkylsiloxane in an amount of 10 to 50 mol %. The organopolysiloxane forming this film contains the alkyl group (such as methyl) of the dialkylsiloxane in an amount of 5 to 25 wt %, preferably 15 to 22 wt %, the aryl group or substituted aryl group (such as phenyl group or substituted phenyl group) of the arylsiloxane in an amount of 5 to 40 wt %, preferably 26 to 37 wt %, and the fluoroalkyl group of the fluoroalkylsiloxane in an amount of 5 to 40 wt %, preferably 26 to 37 wt %.

This film hardly cracks because it has high elasticity (low fragility) and high strength. Foaming is not observed in the interior of the film at the time of molding, whereby excellent transferability can be realized with the result of high dimensional accuracy of the fine uneven surface shape of the film. Since the film contains a fluoroalkyl group, it has excellent releasability from the mold. In concrete terms, when a large number of convex portions having a height of 20 to 100 $\mu$m are formed, nonuniformity in height among the convex portions on the surface of the film is 1 $\mu$m or less. The deviation of the interval between the convex portions on the surface from that of the mold is below measurement accuracy (0.2 $\mu$m).

The substrate used in the present invention may have any shape such as a flat plate-like or curved plate-like shape. The substrate preferably has a warp (length of thermal deformation in a direction perpendicular to the surface of the substrate per unit length in the surface direction of the substrate) of the surface at 200 and 20° C. of ±5 $\mu$m or less per 1 cm. When the warp is beyond this range, the film may peel off from the substrate at the interface or may crack in the molding step. Therefore, it is preferred to select the material, size and shape of the substrate.

This substrate preferably has a linear expansion coefficient of $1.5 \times 10^{-5}$/° C. or less. When the linear expansion coefficient of the substrate is larger than $1.5 \times 10^{-5}$/° C., in the case of a plastic substrate having a high thermal expansion coefficient such as polypropylene (9 to $15 \times 10^{-5}$/° C.), the film may peel off from the substrate at the interface or may crack in the step of forming an organopolysiloxane film. Ordinary inorganic glass has a linear expansion coefficient of $1.5 \times 10^{-5}$/° C. or less. At least the surface of the substrate is made from an oxide. When the surface of the substrate in contact with the organopolysiloxane film is not made from an oxide, adhesion strength tends to be low in the film formation step, whereby the film may peel off from the substrate at the interface in any case. Preferred examples of the material of the substrate include oxide glasses such as silicate-based glass, boric acid-based glass and phosphoric acid-based glass, quartz, ceramics, silicon, metals, epoxy resins and glass fiber reinforced polystyrene. Although the organopolysiloxane film is hardly bonded to a metal as it is, if the surface of the metal is treated with an oxidizing agent in advance, the metal can be used as the substrate.

When a transparent body which transmits light having a desired wavelength, such as visible light, ultraviolet light or infrared light is used as the substrate in the present invention, the article having a predetermined surface shape of the present invention can serve as a transmission optical element such as a lens, diffraction grating or prism. When a transparent or opaque body is used as the substrate, a metal (such as aluminum or silver) or dielectric film (such as magnesium fluoride or titanium oxide) is formed on the organopolysiloxane film to suitably manufacturing a reflection type diffraction grating, a reflection type optical element such as a Fresnel reflector, CD-ROM or other information recording medium.

A description is subsequently given of the material of the optical waveguide element of the present invention.

As for the material of the optical waveguide element of the present invention, the above material having a predetermined surface shape of the present invention is preferably used. That is, the polyorganosiloxane film of the present invention contains at least one of a dialkylsiloxane represented by the above formula (7) and an arylsiloxane (or substituted arylsiloxane) represented by the above formula (8) and a fluoroalkylsiloxane represented by the above formula (9). That is, the above organopolysiloxane film contains the above dialkylsiloxane in an amount of 0 to 95 mol %, the arylsiloxane or substituted arylsiloxane in an amount of 0 to 95 mol % (total of the dialkylsiloxane and the arylsiloxane or substituted arylsiloxane is 30 to 95 mol %) and the fluoroalkylsiloxane in an amount of 5 to 70 mol % based on the total number of mols of the dialkylsiloxane represented by the above formula (7), the arylsiloxane represented by the above formula (8) and the fluoroalkylsiloxane represented by the above formula (9).

A polyorganosiloxane containing the dialkylsiloxane represented by the above formula (7) has a lower refractive index than a polyorganosiloxane containing the arylsiloxane (or substituted arylsiloxane) represented by the above formula (8). The fluoroalkylsiloxane represented by the above formula (9) has a lower refractive index than the dialkylsiloxane represented by the above formula (7). Therefore, a material containing relatively large amounts of the dialkylsiloxane represented by the above formula (7) and the fluoroalkylsiloxane represented by the above formula (9) may be used in the clad portion of the optical waveguide element of the present invention. Particularly the above organopolysiloxane film of the clad portion preferably contains 30 to 60 mol % of the dialkylsiloxane and 40 to 70 mol % of the fluoroalkylsiloxane. A material containing a larger amount of the arylsiloxane (or substituted arylsiloxane) represented by the above formula (8) than the material of the clad portion may be used in the core portion. Particularly the above organopolysiloxane film of the core portion preferably contains 40 to 70 mol % of the arylsiloxane or substituted arylsiloxane and 30 to 60 mol % of the fluoroalkylsiloxane.

Thereby, the core portion of the obtained optical waveguide element has a 0.002 to 0.20 larger refractive index than that of the clad portion. Phenylsiloxane has a refractive index of 1.471, dimethylsiloxane has a refractive index of 1.381, and fluorine-containing alkylsiloxane has a refractive index of 1.360. Since the CH bond of an aromatic ring in the phenyl group or substituted phenyl group represented by the above formula (8) and the CH group bonded to Si which is the heavy atom of the dimethylsiloxane represented by the above formula (7) have absorption at a wavelength different from the ordinary alkyl CH group (having absorption at 1.55 $\mu$m and 1.3 $\mu$m which are communication wavelengths), a material having a low loss at a communication wavelength band of a near infrared range is obtained. A sol-gel material comprising the dialkylsiloxane represented by the above formula (7), for example, dimethylsiloxane and the aryl (or substituted aryl)siloxane represented by the above formula (8), for example, phenyl (or substituted phenyl)siloxane has heat resistance. As this waveguide contains fluorine, it has extremely high durability against chemicals and can further improve heat resistance. Therefore, the dehydration/condensation reaction can be carried out to the fullest extent by raising the treatment temperature at the time of production and the existence of the residual OH group having absorption at a communication wavelength band can be prevented, thereby providing a material having a lower loss.

A description is subsequently given of the process for forming the optical waveguide element of the present invention.

The first process (the above mold pouring process) comprises pouring a sold-gel material solution into a mold having a groove as a concave portion, heating, contacting a substrate to the material and further heating to bond the substrate to the molded film, releasing the mold and finally heating. The thus formed organopolysiloxane film of the present invention has a thin and long convex portion and serves as a channel type optical waveguide.

The second process (the above mold pouring process) comprises pouring a sol-gel material solution containing relatively large amounts of a dialkyldialkoxysilane (or dialkyldihalogensilane) and a fluoroalkylsilane (or fluorine-containing halogensilane) into a mold having a thin and long convex portion, heating, contacting a substrate to the material and further heating to bond the substrate to the molded film. The organopolysiloxane film formed by releasing the mold has a groove as a concave portion. This concave portion is filled with a material having a higher refractive index than a material forming the concave portion (a sol-gel material containing more phenylsiloxane than the material forming the concave portion) to serve as a stepped optical waveguide.

The third process (above mold pouring process) comprises pouring a sold-gel material solution containing a relatively large amount of a silsesquioxy group containing an alkyl group and a fluoroalkyl group into a mold having a thin and long convex portion, heating, contacting a substrate to the material and further heating to bond the substrate to the molded film. An organopolysiloxane film having a concave portion is formed by releasing the mold. The concave portion is filled with a material having a higher refractive index than a material forming the concave portion (a sol-gel material containing more phenylsiloxane than the material forming the concave portion) and coated with a material having the same refractive index as the material forming the concave portion. The thus formed organopolysiloxane film having a core portion and a clad portion serves as an embedded optical waveguide.

The Preferred Embodiment of the Invention

A preferred embodiment of the present invention will be described in detail hereinafter.

A process for producing an article having a fine uneven surface is roughly carried out by the following procedure. (1) preparation of an organopolysiloxane solution, (2) application of the solution to a mold or a substrate and heat treatment, (3) bonding, heat treatment and mold release, and (4) final heating (baking).

Preparation of Organopolysiloxane Solutions (Solutions A and C)

0.075 mol of phenyltriethoxysilane, 0.1 mol of dimethyldiethoxysilane and 0.063 mol of (3,3,3-trifluoropropyl)trimethoxysilane were charged into a beaker and stirred. 0.25 mol of ethanol was added to this solution and stirred, and an aqueous solution containing 0.1 wt % of formic acid dissolved in 1.75 mols (31.5 g) of water was further added and stirred for 2 hours. At the beginning of agitation, the solution was separated into two layers but after 2 hours of agitation, the solution became a transparent homogeneous solution. The thus obtained solution was designated as solution C. The solution C rarely contained raw materials and about 80% of alkoxyl groups (ethoxy or methoxy) initially contained in phenyltriethoxysilane, dimethyldiethoxysilane and trifluoropropylsilane remained as OH groups. When this solution C was heated at 80° C. in an oven for 6 hours, ethanol and water formed from the aqueous solution of formic acid and a polycondensation reaction volatilized. As a result, the solution which initially had a weight of about 83.9 g and a volume of about 100 cm$^3$ was reduced to about 30% of the initial weight and the initial volume, that is, a weight of about 27 g and a volume of about cm$^3$. The thus obtained solution was designated as solution A. The solution A rarely contained ethanol and water and about 50% of alkoxyl groups (ethoxy and methoxy) initially contained in phenyltriethoxysilane, dimethyldiethoxysilane and trifluoropropylsilane remained as OH groups.

Preparation of Organopolysiloxane Solution (Solution B)

0.19 mol of phenyltriethoxysilane, 0.04 mol of dimethyldiethoxysilane and 0.04 mol of (3,3,3-trifluoropropyl) trimethoxysilane were charged into a beaker and stirred. 0.25 mol of ethanol was added to this solution and stirred, and an aqueous solution containing 0.1 wt % of formic acid dissolved in 1.75 mols (31.5 g) of water was further added and stirred for 2 hours. At the beginning of agitation, the solution was separated into two layers but after 2 hours of agitation, the solution became a transparent homogeneous solution. When this solution was heated at 80° C. in an oven for 12 hours, ethanol and water formed from the aqueous solution of formic acid and a polycondensation reaction volatilized. As a result, the solution which initially had a weight of about 103.3 g and a volume of about 100 cm$^3$ was reduced to about 30% of the initial weight and the initial volume, that is, a weight of about 27 g and a volume of about 30 cm$^3$. The thus obtained solution was designated as solution B. The solution B rarely contained ethanol and water and about 50% of alkoxyl groups (ethoxy and methoxy) initially contained in phenyltriethoxysilane, dimethyldiethoxysilane and trifluoropropylsilane remained as OH groups.

Preparation of Organopolysiloxane Solution (Solution D)

0.075 mol of biphenyltrimethoxysilane, 0.1 mol of diethyldimethoxysilane and 0.063 mol of (3,3,3-trifluoropropyl) trimethoxysilane were charged into a beaker and stirred. 0.25 mol of ethanol was added to this solution and stirred, and an aqueous solution containing 0.1 wt % of formic acid dissolved in 1.75 mols (31.5 g) of water was further added. At the beginning of agitation, the solution was separated into two layers but after 3 hours of agitation at 30° C., the solution became a transparent homogeneous solution. The thus obtained solution was designated as solution D. The solution D rarely contained raw materials and about 80% of alkoxyl groups (ethoxy and methoxy) initially contained in phenyltriethoxysilane, dimethyldiethoxysilane and trifluoropropylsilane remained as OH groups.

Application of Solution to Mold or Substrate and Heat Treatment

The above solution A was poured over the surface of a mold in the mold pouring process or over the surface of a substrate in the substrate pouring process to form a layer having a thickness of 50 $\mu$m to 1 mm which was then heated at a temperature of 140 to 180° C. for 20 to 120 minutes. The heat treatment temperature differs according to the type of the solution. The heat treatment of the solution A was started at a temperature of 140 to 160° C. and the temperature was gradually raised to 180° C. over 20 minutes and maintained at that temperature for 40 minutes. A plastic and transformable gelled film (viscosity: $10^4$ to $10^8$ poise) could be formed on the mold or substrate by the above heat treatment.

Bonding, Heat Treatment and Mold Release

In the mold pouring process, the above coated surface (gelled film) was contacted to the surface of the substrate and heated at a temperature of 160 to 250° C. for 20 to 60 minutes to be bonded to the substrate. After the coating film was completely gelled, the mold was released from the substrate. As a result, a fine uneven plate comprising the film having a shape transferred from the mold and bonded to the surface of the substrate was obtained.

In the substrate pouring process, the mold was applied to the gelled film and heated at 250° C. for 20 minutes while being pressed at a pressure of 2 kg/cm$^2$. Thereafter, the mold was released. As a result, a fine uneven plate comprising the film having a shape transferred from the mold and bonded to the surface of the substrate was obtained.

Final Heating

The fine uneven plate obtained by releasing the mold was heated at 350° C. for 15 minutes to obtain an article having an uneven surface.

The performance and characteristic properties of the obtained article having an uneven surface were evaluated by the following methods.

Measurement of Nonuniformity in Height among Convex Portions

Nonuniformity in height among convex portions of the outermost layer was measured by a laser microscope.

Measurement of Heat Resistance and Optical Properties

After a heat resistance test was conducted on articles having an uneven surface produced in Examples and Comparative Examples by keeping them at 300° C. for 2 hours, the existence of cracks was checked by returning the temperature to room temperature to evaluate heat resistance. A He—Ne laser was used to measure the diffraction pattern of a diffraction grating, the convergence of a microlens and the amount of reflection in the interior of the substrate at an incident angle of 6° upon the surface of the substrate before and after the heat resistance test for evaluation. The d-ray refractive index of a film portion was measured using an Abbe refractometer.

EXAMPLE 1

A 2.5 cm×2.5 cm soda-lime glass substrate having a thickness of 3.0 mm (linear expansion coefficient of 1.0× $10^{-5}$° C.) was subjected to ultrasonic alkali cleaning and pure water cleaning as a glass substrate. A fine uneven substrate was formed in accordance with the mold pouring process using the solution A. A glass mold having a total of about 22,500 (150×150) substantially hemispherical arc concave portions with a curvature radius of 120 $\mu$m which were disposed in close contact with one another in a longitudinal direction and a transverse direction was used as a mold. A fine uneven substrate which was a microlens with a film thickness in a flat area after final heating of about 40 $\mu$m and a maximum film thickness from the top of the hemisphere of 125 $\mu$m was formed. The coating thickness of the solution was about 150 $\mu$m, a heat treatment after coating was started at 160° C., and the temperature was gradually raised to 180° C. over 20 minutes and maintained at that temperature for 40 minutes. The pressing and heating conditions included a pressure of 2 kg/cm$^2$ a temperature of 250° C. and a time of 20 minutes. The final heating conditions included a temperature of 350° C. and a time of 15 minutes.

The thus formed organopolysiloxane film was transparent and had a flat area thickness of about 140 $\mu$m and a refractive index of 1.48. A methyl group, phenyl group and trifluoropropyl group were contained in the film in amounts of 11 wt %, 21 wt % and 22 wt % respectively. The film contained dimethylsiloxane in an amount of 45 mol %, phenylsiloxane in an amount of 30 mol % and trifluoropropylsiloxane in an amount of 25 mol %. The focusing distance of the manufactured microlens was 1,947 to 1,950 $\mu$m. When the heights of 100 hemispherical convex portions selected at random of the substrate (measured from the opposite side to the convex portions) were measured, the average height was 150 $\mu$m and the standard deviation was 0.12 $\mu$m. When the heat resistance of this substrate was evaluated, the film did not crack or peel off, and the focusing distances of all the convex portions were in the range of 1,947 to 1,950 µm before and after the heat resistance test. When parallel beams were input upon the opposite side of the film at a right angle to measure the diameter of the converging spot, the diameters of the converging spots of all the convex lenses were 3 µm or less before and after the heat resistance test.

Comparative Example 1

Methyltriethoxysilane, phenyltriethoxysilane, ethanol and water were mixed together in a molar concentration ratio of 1.5:1:1:4, and 0.01 mol of formic acid was added as a catalyst to the obtained solution, stirred at room temperature for about 2 hours and heated at 80° C. for 6 hours to prepare a sol solution.

A fine uneven plate was formed in the same manner as in Example 1 using the same substrate and mold as in Example 1 except that the above sol solution was used in place of the solution A used in Example 1. The film thickness of a flat portion was about 35 µm. When 100 hemispherical convex portions selected at random were measured, the average height was 80 µm and the standard deviation was 1.50 µm. Although convex and concave portions were formed, compared with Example 1, the heights of the hemispherical convex portions were not enough and were only about 40% of those of Example 1. Nonuniformity in height among convex portions in Comparative Example 1 was 10 times that of Example 1 according to the calculation result of the standard deviation of the 100 measurement data. Since nonuniformity was large and the shape of the convex portion was not hemispherical, the shape of the converging spot was bad and the focusing distance greatly differed by each lens.

EXAMPLE 2

A fine uneven substrate was formed in accordance with the substrate pouring process using a glass substrate of the same type and the same size as in Example 1 which had been subjected to ultrasonic alkali cleaning and pure water cleaning and the solution A. A glass mold having 50 tub-like concave portions with a substantially semicircular arc section having a curvature radius of 100 µm disposed in close contact with one another in a vertical direction and coated with a release agent was used as a mold. A fine uneven substrate which was a microlens having a film thickness in a flat area after final heating of about 130 µm and a maximum film thickness from the top of the semicircle of 130 µm was formed. The coating thickness of the solution was about 150 µm, a heat treatment after coating was started at 160° C., and the temperature was gradually raised to 180° C. over 20 minutes and maintained at that temperature for 40 minutes. The pressing and heating conditions included a pressure of 2 kg/cm$^2$, a temperature of 250° C. and a time of 20 minutes. The final heating conditions included a temperature of 350° C. and a time of 15 minutes.

The thus formed organopolysiloxane film was transparent. When the heights of 20 columnar convex portions of this substrate selected at random were measured, the average height from the surface of the substrate was 130 µm and the standard deviation was 0.11 µm. When a heat resistance test was made on this substrate, cracking did not occur in the film, and no changes in the appearance and heights of the convex portions of the film, standard deviation thereof and the pitch of the convex portions were seen.

EXAMPLE 3

A 2.5 cm×2.5 cm silicon echelon diffraction grating having an average thickness of 2.0 mm (about 1,000 linear projection portions were formed on the surface of a silicon substrate by masking and etching, inclined surfaces on both sides of each convex portion agreed with a silicon crystal surface (1,1,1), the step height was 20.15 µm, the step width was 14.3 µm, the interval between adjacent grating lines (measured at ridges) was about 24.7 µm, and the flat portion at top of each ridge (length of the remaining unetched portion) was about 5.0 µm) was prepared as a mold. A fine uneven plate which was a reflection type echelon diffraction grating having a film thickness in a flat area (area devoid of the linear projection portions) of about 40 µm was formed using a glass substrate of the same type and size as in Example 1 which had been subjected to ultrasonic alkali cleaning and pure water cleaning, the above mold and the solution A in accordance with the substrate pouring process. The coating thickness of the solution was about 60 µm, a heat treatment after coating was started at 160° C., and the temperature was gradually raised to 180° C. over 20 minutes and maintained at that temperature for 40 minutes. The pressing and heating conditions included a pressure of 2 kg/cm$^2$, a temperature of 250° C. and a time of 20 minutes. The final heating conditions included a temperature of 350° C. and a time of 15 minutes.

The thus formed organopolysiloxane film was transparent and had a flat area thickness of about 40 µm and a refractive index of 1.48. A methyl group, phenyl group and trifluoropropyl group were contained in the film in amounts of 11 wt %, 21 wt % and 22 wt % respectively. The film contained dimethylsiloxane in an amount of 45 mol %, phenylsiloxane in an amount of 30 mol % and trifluoropropylsiloxane in an amount of 25 mol %. When the heights of 100 steps of this fine uneven plate were measured at intervals of 9 mm in a lengthwise direction of each of 10 linear projection portions selected at random, the average height was 20.2 µm and the standard deviation was 0.05 µm. Thus, a reflection type echelon diffraction grating which comprised a fine uneven plate capable of brazing light having a wavelength of 1.55 µm as 26-th order diffracted light and light having a wavelength of 1.30 µm as 31-st order diffracted light efficiently was obtained. When the heat resistance of this fine uneven plate was evaluated, cracking did not occur in the film, and no changes in the appearance and the height of each convex portion of the film, standard deviation thereof and diffraction pattern were seen before and after the heat resistance test.

EXAMPLE 4

A 2.5 cm×2.5 cm silicon substrate having a thickness of 1.0 mm was subjected to ultrasonic alkali cleaning and pure water cleaning as a substrate. A 2.5 cm×2.5 cm aluminum plate having a thickness of 2.0 mm and a thin and long rectangular convex portion having a height of 10 µm, a width of 10 µm and a length of 20 mm was prepared as a mold. A plate (film thickness of 20 µm, depth of the concave portion of 8 µm and width of the concave portion of 8 µm) having a concave portion as a clad portion was formed using the above substrate, mold and solution A in accordance with the substrate pouring process to ensure that the thickness of a film in the lowest area (portion in contact with the top of the convex portion of the above mold) should become about 10 µm. A heat treatment after coating was started at 160° C. and the temperature was gradually raised to 180° C. over 20 minutes and maintained at that temperature for 40 minutes. The pressing and heating conditions included a pressure of 2 kg/cm$^2$, a temperature of 250° C. and a time of 20 minutes. The mold was then released, the solution B was poured into the concave portion as a core portion and heated at 160° C., and the temperature was gradually raised to 180° C. over 20 minutes and maintained at that temperature for 20 minutes. The solution A for forming the clad portion was coated to a thickness of about 10 μm and heated at 250° C. for 20 minutes.

The thus formed organopolysiloxane film formed on the surface of the substrate was transparent; and an optical waveguide having a core portion (composition: 40 mol % of phenylsiloxane and 40 mol % of trifluoropropylsiloxane) having a height of 8 μm, a width of 8 μm, a length of 20 mm and a high refractive index of 1.40 and a clad portion (composition: 40 mol % of dimethylsiloxane and 60 mol % of trifluoropropylsiloxane) having a low refractive index of 1.37 and surrounding the core portion was formed. When the heat resistance of this optical waveguide was evaluated, cracking did not occur in the film and, and no changes in the appearance of the film, the height and width of the core portion of the film, standard deviations thereof and the transmission of light having a wavelength of 1.55 μm were seen before and after the heat resistance test.

EXAMPLE 5

A fine uneven substrate which was a microlens having a film thickness in a flat area of about 130 μm and a maximum film thickness from the top of the semicircle of 130 μm was formed in the same manner as in Example 2 using the same substrate and mold as in Example 2 except that the solution D was used in place of the solution A used in Example 2. The heights of the columnar convex portions of this substrate and the standard deviation thereof were the same as those in Example 2. When the heat resistance of this substrate was evaluated, cracking did not occur in the film, and no changes in the appearance and the heights of the convex portions of the film, standard deviation thereof and the pitch of the convex portions were seen.

EXAMPLE 6

A fine uneven plate which was a reflection type echelon diffraction grating was formed in the same manner as in Example 3 using the same substrate and mold as in Example 3 except that the solution C was used in place of the solution A used in Example 3.

When the diffraction efficiency of this diffraction grating was measured, it was 65% which was almost the same as the diffraction efficiency (67%) of a silicon echelon diffraction grating which was a mold. When the heat resistance of this fine uneven plate was evaluated, cracking did not occur in the film, and no changes in the appearance and the heights of the convex portions of the film, standard deviation thereof and diffraction pattern were seen before and after the heat resistance test. To measure the diffraction efficiency of this diffraction grating, a gold (Au) reflection coating film having a reflectance of 60% (wavelength of 1,550 nm) was formed on the surface of the diffraction grating by sputtering.

EXAMPLE 7

A fine uneven substrate was formed in accordance with the mold pouring process using a glass substrate of the same type and size as in Example 1 which had been subjected to ultrasonic alkali cleaning and pure water cleaning and the solution A. A glass mold having a total of about 784 (28×28) substantially hemispherical arc convex portions having a curvature radius of 865 μm and disposed in close contact with one another in a longitudinal direction and a transverse direction was used as a mold. A fine uneven substrate which was a microlens having a film thickness in a flat area after final heating of about 100 μm and a maximum film thickness from the top of the hemisphere of 185 μm was formed. The coating thickness of the solution was about 450 μm, a heat treatment after coating was started at 160° C., and the temperature was gradually raised to 180° C. over 20 minutes and maintained at that temperature for 40 minutes. The pressing and heating conditions included a pressure of 2 kg/cm², a temperature of 250° C. and a time of 20 minutes. The final heating conditions included a temperature of 350° C. and a time of 15 minutes.

The thus formed organopolysiloxane film was transparent and had a flat area thickness of about 140 μm and a refractive index of 1.48. A methyl group, phenyl group and trifluoropropyl group were contained in the film in amounts of 11 wt %, 21 wt % and 22 wt % respectively. The film contained dimethylsiloxane in an amount of 45 mol %, phenylsiloxane in an amount of 30 mol % and trifluoropropylsiloxane in an amount of 25 mol %. The focusing distance of the manufactured microlens was 2,497 to 2,500 μm. When the heights of 100 hemispherical convex portions selected at random of this substrate (measured from the opposite side to the convex portions) were measured, the average height was 450 μm and the standard deviation was 0.12 μm. When the heat resistance of this substrate was evaluated, the film did not crack or peel off, and the focusing distances of all the convex portions were in the range of 2,497 to 2,500 μm before and after the heat resistance test. When parallel beams were input from the opposite side of the film at a right angle to measure the diameter of the converging spot, the diameters of the converging spots of all the convex lenses were 3 μm or less before and after the heat resistance test.

Comparative Example 2

Dimethyldiethoxysilane, phenyltriethoxysilane, ethanol and water were mixed together in a molar concentration ratio of 1.5:1:1:4, and 0.01 mol of formic acid was added as a catalyst to the obtained solution, stirred at room temperature for about 2 hours and heated at 80° C. for 6 hours to prepare a sol solution.

A fine uneven plate was formed in the same manner as in Example 7 using the same substrate and mold as in Example 7 except that the above sol solution was used in place of the solution A used in Example 7. The film thickness in a flat portion was about 100 μm. However, when 100 hemispherical convex portions selected at random were measured, the average height was 400 μm and the standard deviation was 0.60 μm. Although convex and concave portions were formed, compared with Example 7, a release failure occurred in part of the film and 80% of all the convex portions had a predetermined height. Nonuniformity in height among convex portions in Comparative Example 2 was 5 times larger than that of Example 7 according to the calculation result of the standard deviation of the 100 measurement data. Lenses having the film released from the mold showed the same focusing distance as in Example 7 while lenses having a release failure which accounted for 20% of all the lenses were not hemispherical and the shape of the converging spot was bad and could not be measured.

According to the present invention, since the volume shrinkage of the polysiloxane film at the time of curing is small and an alkyl group or aryl group remains in the film in large quantities to provide high elasticity to the film (less fragile), the film has high strength and rarely cracks. Further, since the film contains fluorine, it has excellent releasability with a mold. Therefore, an article and an optical waveguide which have high heat resistance and chemical resistance and a predetermined surface shape thanks to a thick organopolysiloxane film can be obtained at a low cost.

What is claimed is:

1. A process for producing an article having a predetermined surface shape, which comprises disposing a sol-gel material between a substrate and a mold in the form of a film so as to make the sol-gel material closely contact with the substrate and the mold, and heating the film to form a gelled film having a surface shape which is the inversion of the surface shape of the mold on the surface of the substrate, said sol-gel material containing (A) a silane compound represented by the following formula (1) and (B) a silane compound represented by the following formula (2), and (C) a silane compound represented by the following formula (3):

$$R^1{}_2SiX_2 \qquad (1)$$

wherein $R^1$ is an alkyl group and X is an alkoxyl group or halogen atom, $$R^2SiY_3 \qquad (2)$$

wherein $R^2$ is an aryl group or substituted aryl group and Y is an alkoxyl group or halogen atom, $$R^3SiZ_3 \qquad (3)$$

wherein $R^3$ is a fluorine-containing alkyl group and Z is an alkoxyl group or halogen atom, in an amount of 30 to 60 mole %, 10 to 50 mole % and 5 to 60 mole % based on the total number of moles of the components (A), (B) and (C), respectively.

2. The process of claim 1, wherein the component (A) is dimethyldiethoxysilane, the component (B) is phenyltriethoxysilane or substituted phenyltriethoxysilane, and the component (C) is (3,3,3-trifluoropropyl)trimethoxysilane.

3. An article having a predetermined surface shape, which comprises a substrate and an organopolysiloxane film having a maximum thickness of 1 μm to 1 mm formed on the surface of the substrate, wherein the organopolysiloxane film contains as essential ingredients of dialkylsiloxane represented by the following formula (4) and an arylsiloxane or substituted arylsiloxane represented by the following formula (5), and (6) a fluoroalkylsiloxane represented by the following formula (6):

$$R^4SiO_{2/2} \qquad (4)$$

wherein $R^4$ is an alkyl group, $$R^5SiO_{3/2} \qquad (5)$$

wherein $R^5$ is an aryl group or substituted aryl group, $$R^6SiO^{3/2} \qquad (6)$$

wherein $R^6$ is a fluorine-containing alkyl group, in an amount of 30 to 60 mole %, 10 to 50 mole % and 10 to 50 mole % based on the total number of moles of the dialkylsiloxane, arylsiloxane and fluoroalkylsiloxane, respectively.

4. The article of claim 3, wherein the organopolysiloxane film contains the alkyl group of the dialkylsiloxane, the aryl group (or substituted aryl group) of the arylsiloxane and the fluoroalkyl group of the fluoroalkylsiloxane in amounts of 5 to 25 wt %, 5 to 40 wt % and 5 to 40 wt %, respectively.

5. The article of claim 3, wherein the organopolysiloxane film has concave and convex portions with a predetermined width of 1 to 500 μm and a predetermined height of 5 to 500 μm on the surface.

6. An optical waveguide element which has a 10 μm to 1 mm thick organopolysiloxane film formed on the surface of a substrate, the organopolysiloxane film consisting of a core portion for transmitting light, having a height of 5 to 30 μm, a width of 5 to 30 μm and length extending along the surface of the organopolysiloxane film and a clad portion surrounding the core portion and having a lower refractive index than the core portion, wherein the organopolysiloxane film for the clad portion contains a dialkylsiloxane represented by the following formula (7) and a fluoroalkylsiloxane represented by the following formula (9) in an amount of 30 to 60 mole % and 40 to 70 mole % based on the total number of moles of the dialkylsiloxane and fluoroalkylsiloxane, respectively, and the organopolysiloxane film for the core portion contains an arylsiloxane or substituted arylsiloxane represented by the following formula (8) and fluoroalkylsiloxane represented by the following formula (9) in amount of 40 to 70 mole % and 30 to 60 mole % based on the total number of moles of the arylsiloxane or substituted arylsiloxane and fluoroalkylsiloxane, respectively, wherein:

$$R^7{}_2SiO_{2/2} \qquad (7)$$

wherein $R^7$ is an alkyl group, $$R^8SiO_{3/2} \qquad (8)$$

wherein $R^8$ is an aryl group or substituted aryl group, $$R^9SiO_{3/2} \qquad (9)$$

wherein $R^9$ is a fluorine-containing alkyl group.

7. The optical waveguide element of claim 6, wherein the core portion has a 0.002 to 0.20 larger refractive index than the clad portion.

* * * * *